US012098585B1

(12) United States Patent
Schuft

(10) Patent No.: US 12,098,585 B1
(45) Date of Patent: Sep. 24, 2024

(54) POWERED GARAGE DOOR

(71) Applicant: PREMIER DOOR Co., Stewart, MN (US)

(72) Inventor: Nicolas Dale Schuft, Stewart, MN (US)

(73) Assignee: PREMIER DOOR Co., Stewart, MN (US)

( * ) Notice: Subject to any disclaimer, the term of this patent is extended or adjusted under 35 U.S.C. 154(b) by 675 days.

(21) Appl. No.: 17/111,326

(22) Filed: Dec. 3, 2020

Related U.S. Application Data

(60) Provisional application No. 62/942,843, filed on Dec. 3, 2019.

(51) Int. Cl.

| | |
|---|---|
| ***E05F 15/70*** | (2015.01) |
| ***E05F 15/53*** | (2015.01) |
| *E06B 3/70* | (2006.01) |
| *E06B 3/72* | (2006.01) |

(52) U.S. Cl.

CPC .............. *E05F 15/70* (2015.01); *E05F 15/53* (2015.01); *E05Y 2201/454* (2013.01); *E05Y 2400/326* (2013.01); *E05Y 2400/36* (2013.01); *E05Y 2900/106* (2013.01); *E06B 2003/7044* (2013.01); *E06B 2003/7074* (2013.01); *E06B 3/726* (2013.01)

(58) Field of Classification Search

CPC .. E05F 15/53; E05F 15/70; E06B 2003/7004; E06B 2003/7074; E06B 3/726; E05Y 2900/106

USPC ........................................................... 49/199

See application file for complete search history.

(56) References Cited

U.S. PATENT DOCUMENTS 2,067,623 A * 1/1937 Smith ........................ E05F 1/02 49/390
2,484,674 A * 10/1949 Berry .................... E05F 1/1075 16/400
2,863,181 A * 12/1958 Josephson ................. E06B 3/01 49/387
2,911,211 A * 11/1959 Umbricht .............. E05F 15/673 49/340

(Continued)

FOREIGN PATENT DOCUMENTS

CH 710 242 * 4/2016

OTHER PUBLICATIONS

Level Developments, Ltd, LCH-A-S-90-10-05 : +90° C. Single Axis, 0.5V to 9.5V Output, retrieved online in Nov. 2020 at https://www.leveldevelopments.com/wp/wp-content/uploads/documents/LCH-A-S_Single_Axis_Low_Cost_Inclinometer.pdf.

*Primary Examiner* — Gregory J Strimbu

(74) *Attorney, Agent, or Firm* — Shewchuk IP Services, LLC; Jeffrey D. Shewchuk

(57) ABSTRACT

A powered garage door pivots about a fixed pivot axis extending from the one side edge to the other side edge beneath the top edge of the door panel, such that when moving from the closed position to an opened position the top edge moves rearwardly while the bottom edge moves forwardly. A front top header finishing plate is fixed so as to extend downwardly from the header in front of and beneath the top edge of the door panel. An inclinometer sensor is secured to the door panel, sensing the angle of the door panel as it pivots between closed and opened positions. Hydraulic cylinders are controlled by the electronic controller based on the inclinometer signal, and a graphical user interface allows the user to set both zone sizes (based on inclination angle) and zone speeds, independently for opening and closing.

17 Claims, 8 Drawing Sheets

(56) References Cited

U.S. PATENT DOCUMENTS

| | | | | |
|---|---|---|---|---|
| 3,295,157 | A * | 1/1967 | Gluth .................. | E05D 13/1215 16/400 |
| 3,484,992 | A * | 12/1969 | Blumenthal .............. | E05F 3/04 49/379 |
| 6,883,273 | B2 | 4/2005 | Kerkvliet | |
| 7,814,957 | B2 | 10/2010 | Crown | |
| 8,245,446 | B2 | 8/2012 | Betker | |
| 8,327,586 | B2 | 12/2012 | Keller et al. | |
| 8,539,716 | B2 | 9/2013 | Betker | |
| 8,714,229 | B2 | 5/2014 | Crown et al. | |
| 8,769,871 | B2 | 7/2014 | Betker | |
| 8,800,208 | B2 | 8/2014 | Keller et al. | |
| 9,015,996 | B2 | 4/2015 | Betker | |
| 9,091,107 | B2 | 7/2015 | Betker | |
| 9,404,301 | B2 | 8/2016 | Betker | |
| 9,428,951 | B2 | 8/2016 | Betker | |
| 9,523,233 | B2 | 12/2016 | Keller et al. | |
| 10,208,529 | B2 | 2/2019 | Betker | |
| 10,604,991 | B2 | 3/2020 | Schweiss | |
| 2002/0029524 | A1 * | 3/2002 | Kerkvliet ................ | E05F 15/53 49/200 |
| 2011/0185635 | A1 * | 8/2011 | Keller ..................... | E05F 15/50 49/327 |
| 2015/0368950 | A1 * | 12/2015 | Baczweski ............ | E05D 15/445 49/506 |

* cited by examiner

POWERED GARAGE DOOR

CROSS-REFERENCE TO RELATED APPLICATION(S)

The present application claims the benefit of U.S. provisional patent application Ser. No. 62/942,843, filed Dec. 3, 2019, entitled “Powered Garage Door”. The contents of U.S. provisional patent application Ser. No. 62/942,843 are hereby incorporated by reference in entirety.

BACKGROUND OF THE INVENTION

The present application relates to what are commonly referred to as garage doors (regardless of whether installed on a garage or on a different building), and to methods and structures for powering garage doors between open and closed positions. While many garage doors have multiple panels in which all of the panels translate during the opening/closing movement, the present invention is primarily directed to garage doors having at least one panel which pivots about a stationary pivot axis. Typically, the power for opening or closing is provided by one or more power cylinders which lengthen or shorten to provide the movement. In many instances, the power for the power cylinders will be hydraulic. While such garage doors can be used in residential applications, they are primarily used in aviation, commercial and industrial settings.

For instance, U.S. Pat. Nos. 6,883,273, 8,327,586, and 8,800,208, 9,523,233, 10,604,991 each disclose this type of garage door formed as a single panel. U.S. Pat. Nos. 7,814,957 and 8,714,229 each disclose this type of garage door formed of two panels. The single or top panel of the door is hinged by a piano hinge or a series of hinges along its top surface to a header over the door. While such doors could be formed of wood or similar material, in most applications the door panel itself is primarily formed by a skeleton of vertical and horizontal metal supports which are welded together, with a sheet of thin material (typically sheet metal) connected on one side (typically the outer side) of the skeleton. As an example, the size of one prior art hydraulically powered garage door formed of a single panel is nearly fourteen feet tall and over forty-eight feet wide. The top hinged connection may be finished with a rubber seal to prevent water, etc. from coming in and/or to protect the hinged connection. Better, less costly, and more water and weatherproof powered garage doors are needed.

SUMMARY OF THE INVENTION

The present invention is a powered garage door which, in one aspect, has an improved pivot structure for the door panel, and, in another aspect, has an improved control strategy. Pivot connectors are used about a fixed pivot axis extending from the one side edge to the other side edge beneath the top edge of the door panel, such that when moving from the closed position to an opened position the top edge moves rearwardly while the bottom edge moves forwardly. At least a front top header finishing plate is fixed so as to extend downwardly from the header in front of and beneath the top edge of the door panel, such that the front top header finishing plate resists precipitation entry between the header and the top edge of the door panel. An inclinometer sensor is secured to the door panel, sensing the angle of the door panel as it pivots between closed and opened positions. The rate of extension or retraction of the linear actuator(s) is controlled by the electronic controller based on the inclinometer signal, and a graphical user interface allows the user to set both zone sizes (based on inclination angle) and zone speeds, independently for opening and closing.

BRIEF DESCRIPTION OF THE DRAWINGS

The present invention is described with reference to the attached drawing sheets, in which.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
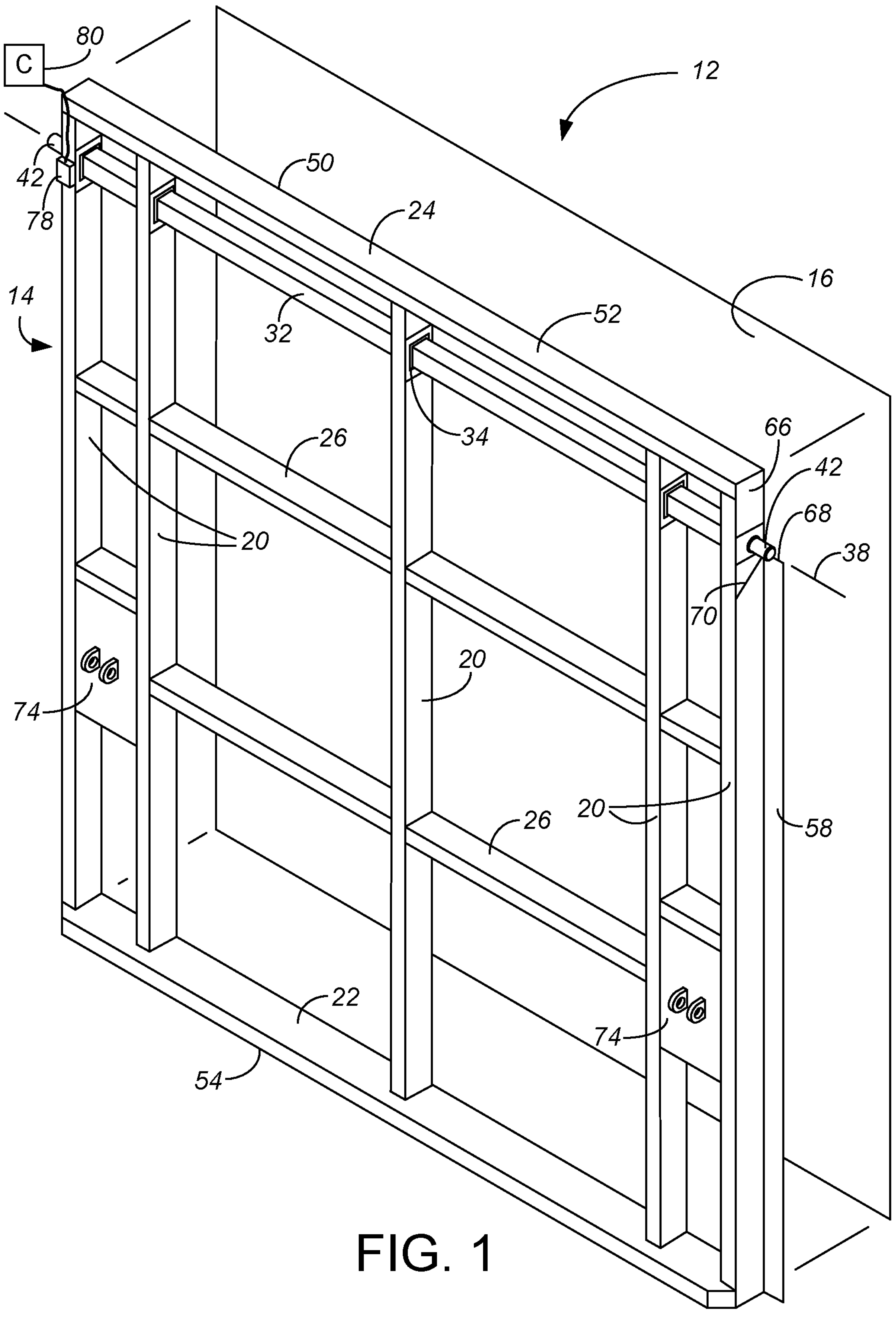
FIG. 1 is a perspective view of a preferred door panel for use in the powered garage door in accordance with the present invention, shown from behind the door, exploded to show the difference between the welded door skeleton and the sheet material.

The present invention is a powered garage door 10 which uses at least one door panel 12, a simple and small version of which is shown in FIG. 1. While the door panel could be a top door panel of a bi-fold door with another panel (not shown) hinged to a bottom edge 54 of the door panel 12 shown, more preferably the door panel 12 is used for a single panel garage door. The single panel door of the present invention has fewer moving parts than many other types (bi- or multi-fold, lift-strap or sliding) of garage doors, often resulting in lower maintenance costs and repair problems over time. The powered garage door 10 is used in a building (not shown) most commonly having vertical walls (not shown), in which case the closed position of the door panel 12 is in a vertical plane generally coplanar with one of the building walls.

The door panel 12 is preferably formed as a skeleton frame structure 14 supporting a sheet 16 of thin material. While the door panel 12 could be partially or fully made of wood or other organic building materials or of polymer materials, and while part or all of the sheet material 16 could alternatively be glass, more preferably both the skeleton frame structure 14 and the sheet material 16 are formed of metal, with aluminum or more preferably steel being common choices. In the most preferred embodiment, the door skeleton 14 and support uprights 18 are formed from commercial grade steel to out-last and out-perform other hydraulic doors. The preferred skeleton 14 includes vertical (with "vertical" being oriented in accordance with the closed position of the door panel 12) studs 20 which run the height of the door panel 12 between a foot plate 22 and a top plate 24. The spacing between the vertical studs 20 can be selected as desired for the strength requirements of the door 10 and the materials and stud strengths selected, with one preferred spacing being at about six foot intervals, i.e., the door panel 12 depicted in FIG. 1 is about fourteen feet wide. For wider door panels up to about fifty feet wide, more vertical studs 20 are used. The lengths of the vertical studs 20 depends upon the desired height of the door panel 12, with the door panel 12 depicted in FIG. 1 being generally square and about fourteen feet tall. To minimize cost, the vertical studs 20 have a cross-section which matches those commonly used in wall construction, such as (in the United States) being tubular of about 1½×3½ inch outer dimensions, with the depicted foot plate 22 being tubular of about 1½×5½ inch outer dimensions. The sheet metal 16 is attached on what will commonly be the outer or front side of the door 10 when hung on the building, so the sheet metal 16 is exposed to the elements such as precipitation and sunlight and protects the skeleton 14 and the interior of the building from the elements. Horizontal braces 26 are welded or otherwise suitably connected between the vertical studs 20. The horizontal braces 26 can be sized to match the vertical studs 20, i.e., about 1½×3½ inch outer dimensions. While angled or additional braces could be used to add strength to the skeleton frame 14, the preferred embodiment rigidly attaches the sheet metal 16 to the skeleton frame 14 at numerous locations, and the sheet metal 16 helps maintain the right angles of the skeleton frame 14. While most garage doors are rectangular with a horizontal foot plate 22 and a horizontal top plate 24, the present invention can also be used in other shapes or layouts of garage doors.

Figure 3:
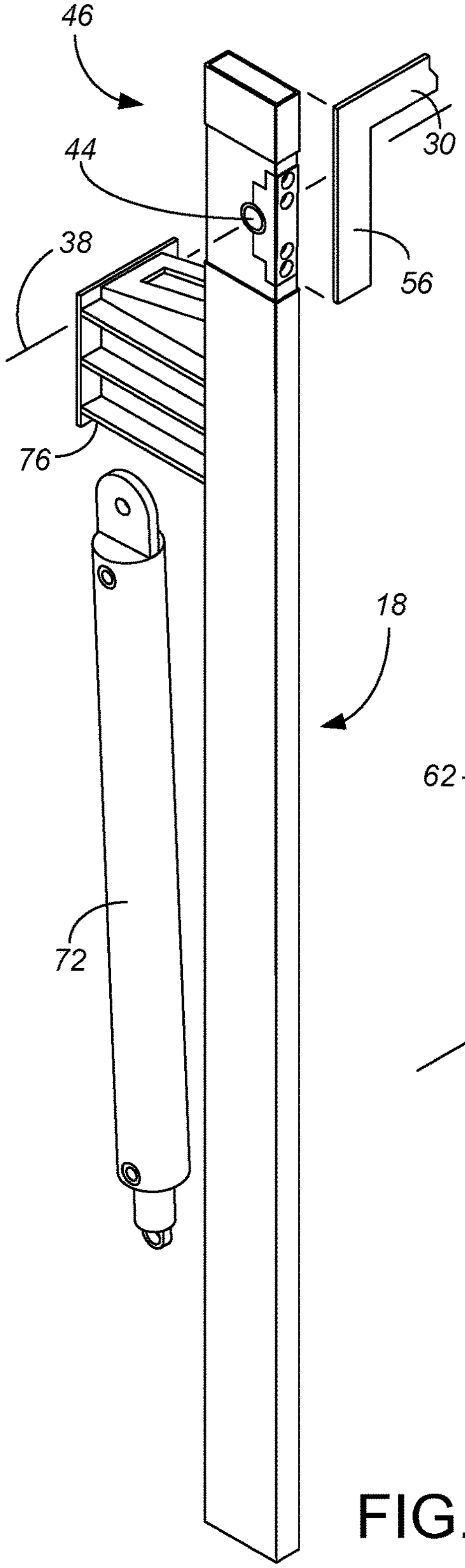
FIG. 3 is an exploded perspective view of a preferred left upright and hydraulic cylinder for use in the powered garage door in accordance with the present invention, shown from in front of the upright. The right upright is identical, with the mounting bracket and hydraulic cylinder mounted in an opposing symmetrical arrangement.
Figure 4:
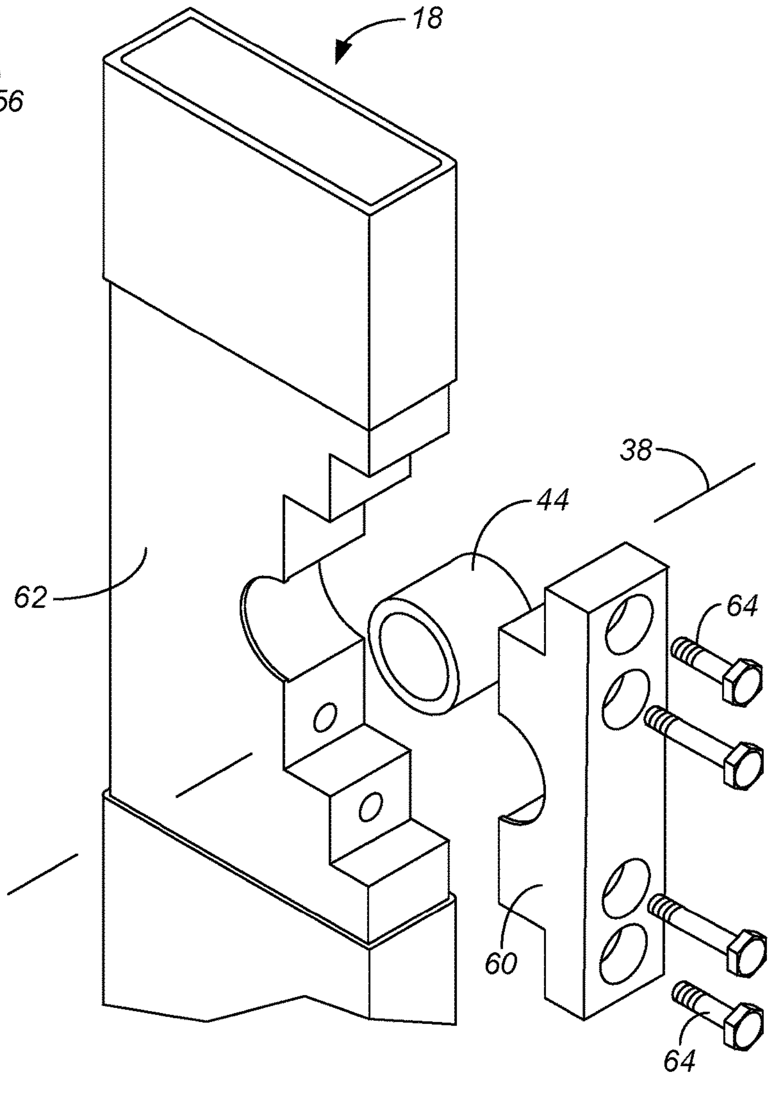
FIG. 4 is an exploded perspective view of the bushing support assembly and bushing at the top of the upright of FIG. 3.
Figure 6:
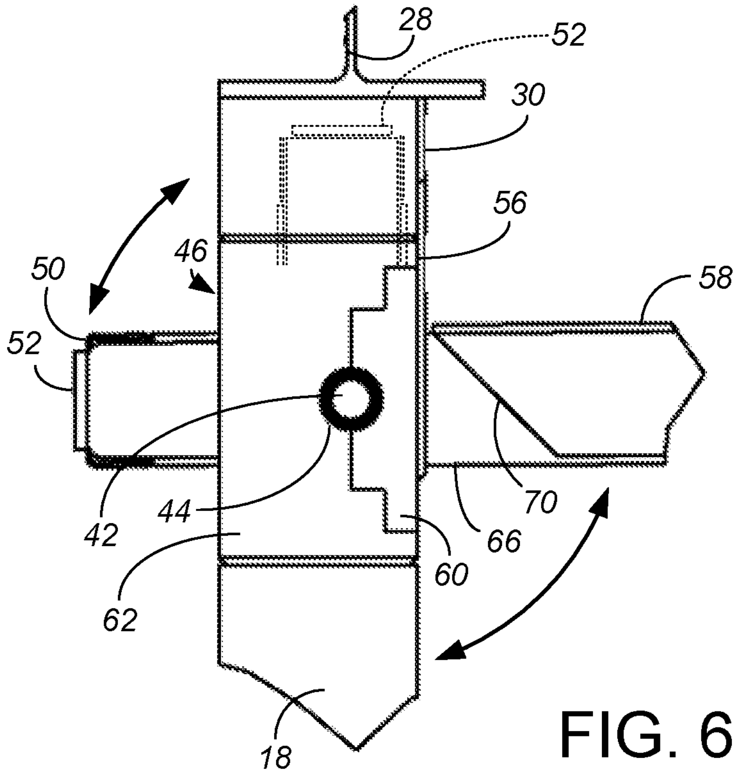
FIG. 6 is an enlargement of the pivot connector shown in FIG. 5, but also showing the top of the door panel in the closed position in dashed lines.
Figure 7:
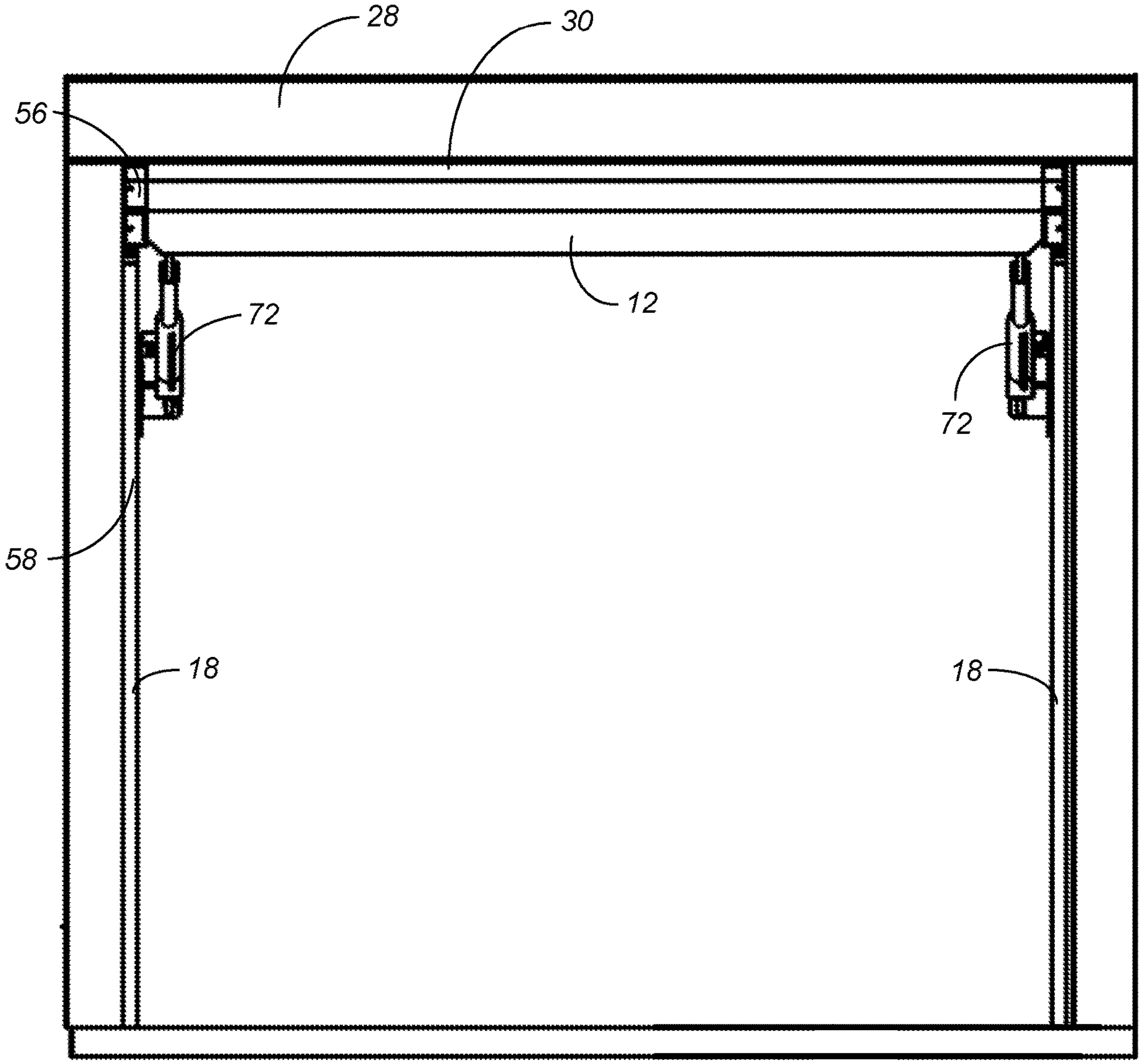
FIG. 7 is an elevational view of the preferred power garage door in accordance with the present invention in the opened position, from in front of the door.

When positioned in the wall of a building, the door opening will be defined by two uprights 18 supporting ends of a door header 28. Preferred uprights 18 are shown in FIGS. 3 and 4. The door header 28, best shown only in FIG. 7, is mostly insignificant to the present invention other than supporting the front top header finishing plate 30, and can be formed as convenient for the building wall construction. In use, the door panel 12 in the closed position will be in plane with the plane defined by the uprights 18 and the door header 28.

Figure 2:
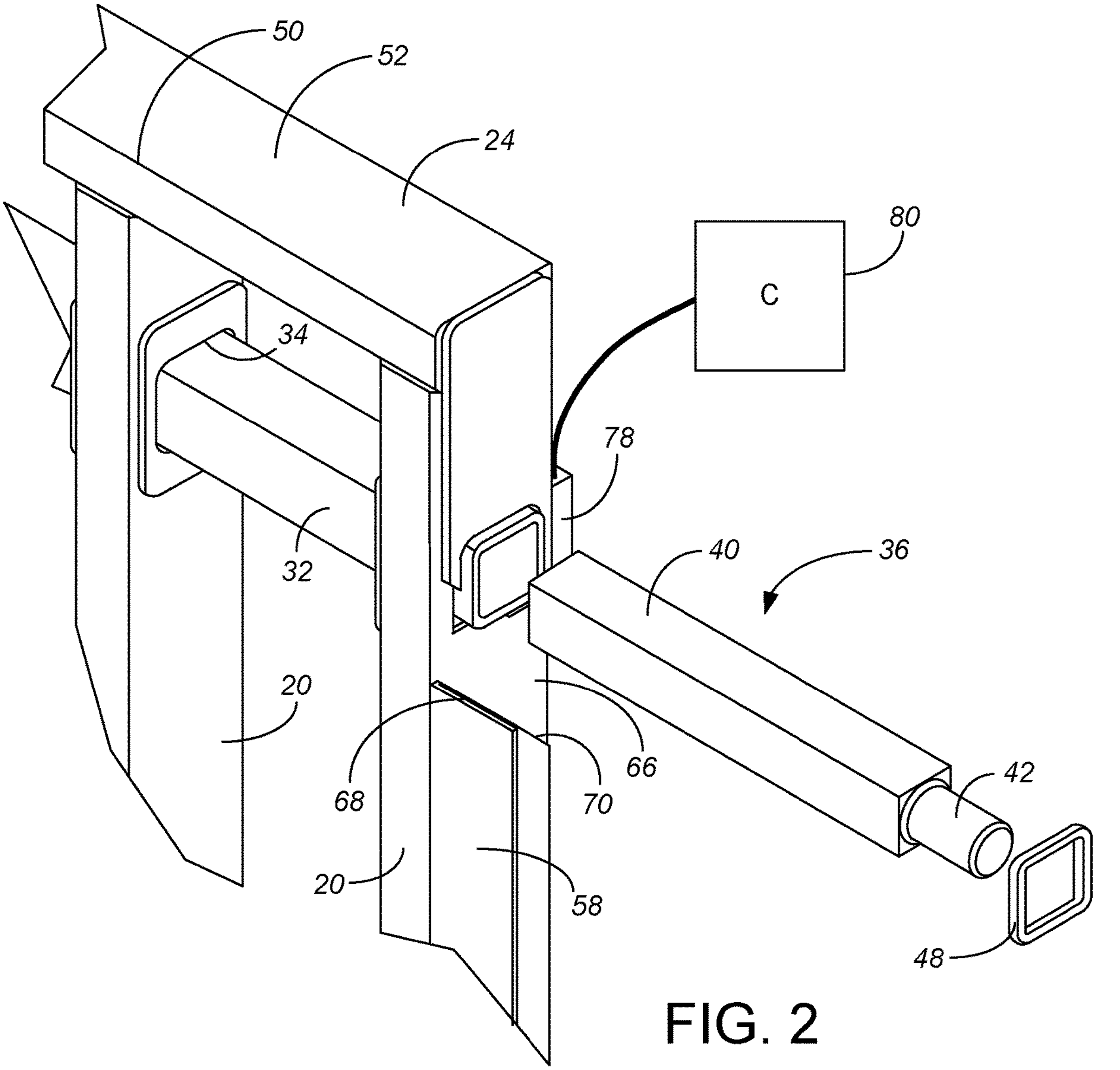
FIG. 2 is an exploded perspective view of the upper corner of the preferred door skeleton of FIG. 1, shown from in front of the door (without the sheet material).
Figure 8:
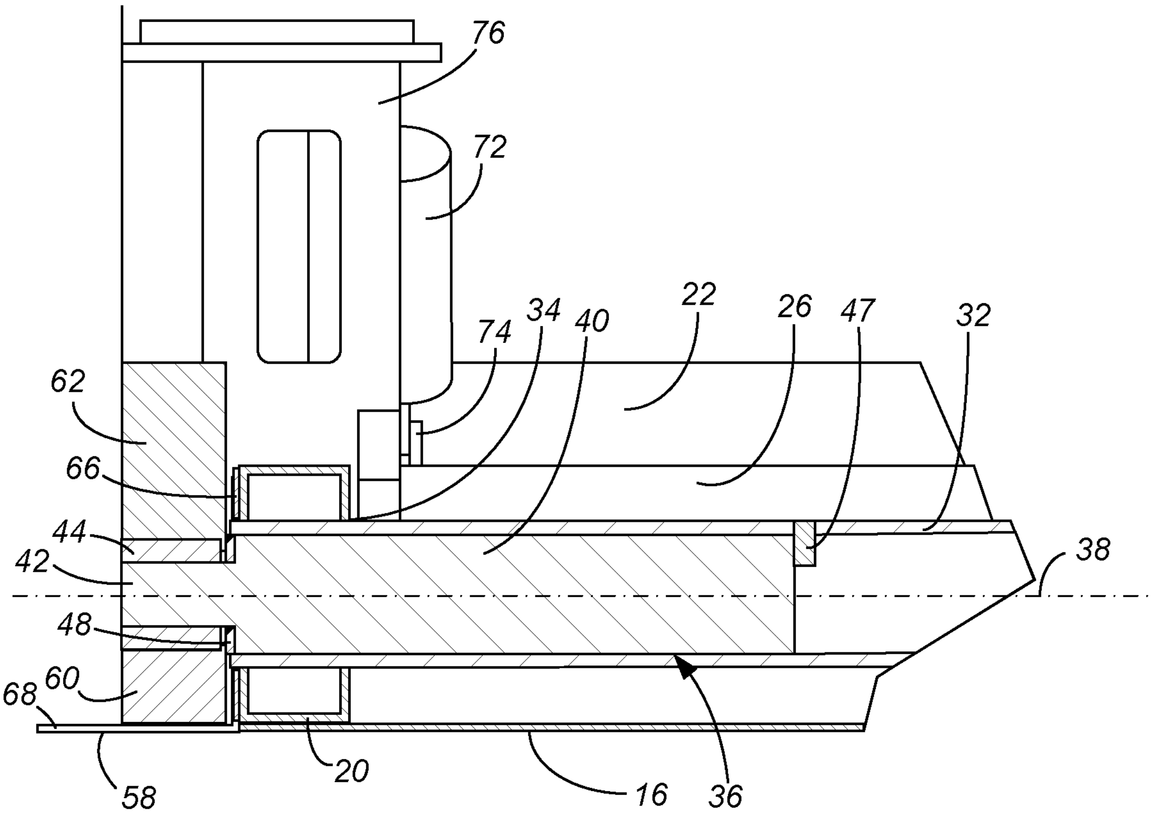
FIG. 8 is a cross-sectional plan view of the left side of the preferred power garage door in accordance with the present invention in the closed position, taken along the pivot axis.

The skeleton 14 also includes a pivot tube 32. With use of the pivot tube 32, the preferred door 10 of the present invention has no hinge along its top edge, and is referred to as a "zero hinge" or "zero visible hinge" door 10. In the preferred embodiment, the pivot tube 32 is generally square in cross-section and hollow. The pivot tube 32 preferably runs the entire length of the door panel 12, slightly lower than the top plate 24 but separate from the top plate 24. To have the pivot tube 32 run the entire length of the door panel 12, cutouts 34 are made into and through centers of the vertical studs 20. As shown in FIG. 2, each end of the pivot tube 32 is open to receive a pivot arm 36 which defines the pivot axis 38 for the door 10. For instance, the pivot tube 32 can define a 2×2 inch inner longitudinal recess on each end. The preferred pivot arms 36 include a rectangular section 40 which after assembly resides inside the pivot tube 32 and a cylindrical section 42 which after assembly extends outside the ends of the pivot tube 32, past the side edge of the door panel 12. The cylindrical section 42 is in turn received within a stationary bushing 44 supported in a bushing assembly 46. As known in the bearing art, the stationary bushing 44 is formed of a smooth, lubricious material relative to the pivot arm 36, so as to provide bearing support while minimizing rotational friction. Alternatively, ball bearings or other similar known bearing structures could be used to reduce friction for the pivoting motion of the door panel 12. The cylindrical section 42 of the pivot arm 36 must be strong enough to carry the substantial entirety of the weight of the door panel 12 without shearing, and in preferred embodiments is within the range of about 1 to 2 inches in diameter. The rectangular section 40 of the pivot arm 36 must extend for a sufficient length and mate with the interior of the pivot tube 32 sufficiently tightly to hold the pivot arm axis horizontal, coincident with the pivot tube axis, despite the moment put on the pivot arm 36 by the weight of the door panel 12. To better resist such shear, the cylindrical section 42 is a cylindrical door pivot which is integrally formed with the rectangular section 40 of the pivot arm 36, such as both out of solid steel. In the preferred embodiment, the rectangular section 40 extends for at least 2 inches, and more preferably for about 12 inches or more within the pivot tube 32. A stop 47 (shown only in FIG. 8) may be positioned within the pivot tube 32 so the pivot arm 36 cannot be further inserted into the pivot tube 32 than desired. A spacer 48 can be used to help ensure proper side to side positioning of the door panel 12 relative to the uprights 18.

In the preferred embodiment, the pivot axis 38 for the door 10 coincides with the longitudinal axis of the pivot tube 32, centered front to back within the door skeleton 14. This places the door pivot axis 38 significantly further back than prior art hinged constructions, which placed the door pivot axis entirely in front of the skeleton. With such a front/back centered-in-skeleton pivot axis 38, the front corner 50 of the top plate 24 is about 1¾ inches in front of the pivot axis 38. This also places the door pivot axis 38 significantly lower with respect to the top of the door panel 12 than prior art constructions using a stationary pivot axis, which placed the door pivot axis entirely above the skeleton. Because the door pivot axis 38 is below the top of the door panel 12, the top edge 52 of the door panel 12 moves rearwardly during opening while the bottom edge 54 of the door panel 12 moves forwardly. The vertical separation between the pivot tube 32 and the top plate 24 ends up defining the gap-when-open between the door panel 12 and the building header 28, which in most applications should be held relatively small. The vertical separation between the pivot tube 32 and the top plate 24 (together with the thickness of the door panel 12) also determines how much the front corner 50 of the top plate 24 will rise during opening of the door panel 12. If the pivot tube 32 abuts the top plate 24, the pivot axis 38 will be about 2¾ inches below the front corner 50 of the top plate 24, so that door panel rotation would require a gap (assuming a rectangular cross-section header 28) of more than ½ inch of the header 28 over the top plate 24. More preferably the pivot axis 38 is between 3 and 12 inches lower than the front corner 50 of the top plate 24. In the preferred embodiment, the spacing between the pivot tube 32 and the top plate 24 places the pivot axis 38 about 6¾ inches below the front corner 50 of the top plate 24, so a gap (assuming a rectangular cross-section header 28) of only about ¼ inch of the header 28 over the top plate 24 is necessary to account for the upward and rearward rotation of the front corner 50 of the top plate 24 during opening.

The preferred zero visible hinge arrangement allows the top edge 52 of the door panel 12, where the door panel 12 in the closed position abuts or meets with the customer header 28, to be finished with a front top header finishing plate 30, without having to cover or seal a piano hinge arrangement. The top finishing plate 30 is stationary throughout opening and closing of the door 10. The top finishing plate 30 is preferably machined of metal, and can extend immediately in front of the top edge 52 of the door panel 12 when closed, thereby preventing precipitation from entering the building past the top edge 52 of the door panel 12. That is, because the opening motion of the door 10 causes the top edge 52 of the door panel 12 to move rearwardly, the lower edge of the top finishing plate 30 can be at an elevation slightly lower than the top edge 52 of the door panel 12 is when closed. Thus, the top header finishing plate 30 projects downward with its bottom edge at least ¼ inch or more lower than the bottom of the header 28, fully covering the gap between the top of the door panel 12 and the header 28, helping to prevent entry of precipitation over the top of the door panel 12. The top finishing plate 30 can be finished to provide a sleek decorative appearance to the outside of the door 10. The top finishing plate 30 can also provide a stop for the door panel 12 when closing, when the top edge 52 of the door panel 12 contacts the rear surface of the top finishing plate 30 to complete its motion forward. If desired, the closed position may involve pressing the top edge 52 of the door panel 12 against the back surface of the top finishing plate 30, further sealing the top edge 52 of the door panel 12 against the elements and entry of precipitation while closed.

In the preferred arrangement, two stationary upper side finishing plates 56 extend downwardly lower than the top edge 52 of the door panel 12 and lower than the bottom of the top finishing plate 30, but in plane with the top finishing plate 30. As best seen in FIG. 3, the stationary upper side finishing plates 56 are located at a width and elevation which covers the upper portions of the uprights 18 and at least partially covers the front of the door column pivot assembly 46. In the preferred embodiment, each upper side finishing plate 56 is fixed so as to extend downwardly from an end of the front top header finishing plate 30. For the portion of the upper side finishing plate 56 which is more than 1¾ inches above the pivot axis 38, the upper side finishing plate 56 can extend inwardly to cover the seam where the door panel 12 abuts with the uprights 18, but the preferred upper side finishing plates 56 do not cover this seam. Instead, the preferred upper side finishing plates 56 extend downward to a location lower than the fixed pivot axis 38, so as to be in plane and vertically in line with the two primary front side edge finishing plates 58 (discussed below) when the door panel 12 is in the closed position.

In the preferred embodiment, the bushings 44 are held in place within a bushing assembly 46, best shown in FIGS. 3 and 4. In contrast with the hollow uprights 18, the bushing assembly 46 includes a front bracket 60 releasably secured to a back bracket 62, both of which are formed of solid metal. The front bracket 60 and the back bracket 62 sandwich and hold the bushing 44. The fasteners such as bolts 64 securing the front bracket 60 to the back bracket 62 are preferably removable with a tool, so the front bracket 60 and cylindrical bushing 44 can be removed from the back bracket 62, thereby facilitating assembly or disassembly of the door panel 12 to the bushings 44 and side uprights 18.

To further complete both the aesthetic look of the door 10 and its ability to seal out precipitation, the preferred embodiment also includes two primary side finishing plates 58 best shown in FIGS. 1 and 2. Unlike the top finishing plate 30, the primary side finishing plates 58 are preferably attached to the door panel 12 and move with the door panel 12. The primary side finishing plates 58 are constructed like an angle iron with one of its sides attached to the side edge 66 of the door panel 12, extending upward from the bottom 54 of the door panel 12 to just below the upper side finishing plates 56. For a door panel 12 which opens to 90°, the maximum height of the top of the primary side finishing plates 58 is one half the door panel thickness lower than the pivot axis 38, i.e., 1¾ inches lower than the pivot axis 38, before the upper edge 68 of the primary side finishing plate 58 contacts the front of the bushing assembly 46 when the door panel 12 is fully opened. The primary side finishing plates 58 extend immediately in front of the support columns 18 while the door 10 is in the closed position, thereby preventing precipitation from entering the building past the side edges 66 of the door panel 12. That is, because the opening motion of the door panel 12 causes the side edges 66 of the door panel 12 beneath the pivot axis 38 to move forwardly, the outer edge of the primary side finishing plates 58 can be wider than the inside edges of the support columns or uprights 18. The primary side finishing plates 58 are preferably machined of metal and have the same type of finishing as the top finishing plate 30 to provide the sleek aesthetic appearance to the door 10 as a whole. The preferred door-attached side finishing plates 58 have the identical width and alignment as the stationary upper side finishing plates 56, mating closely below the stationary upper side finishing plates 56 when the door 10 is closed. So there is no interference between the door-attached side finishing plates 58 and the in-line stationary upper side finishing plates 56 during the opening/closing motion, the back 70 of the angle iron is cut at an angle shown in FIGS. 1 and 2. The arrangement of the finishing plates 30, 56, 58 thus provides a modernized appearance for seamless integration into a building design to meet the demands of top architects and designers. During closing of the door 10, the primary side finishing plates 58 act as a stop to prevent further rotation of the door panel 12 beyond the vertical orientation. If desired, the closed position may involve pressing the primary side finishing plates 58 against the uprights 18, further sealing the side edges 66 of the door panel 12 against the elements and entry of precipitation while closed.

As one alternative, stationary side finishing plates (not shown) could be provided, attached to the front face of the uprights 18, which do not extend in front of the side edges 66 of the door panel 12 when closed, such as extending finishing plates 56 for the entire height of the door. This would allow the side edges 66 of the door panel 12, beneath the pivot elevation, to move forwardly as the door panel 12 is opened, without interference with the side finishing plates. As one alternative to including side finishing plates (which in some embodiments are omitted), the support columns or uprights 18 could be finished to match the top finishing plate 30 and complete the look of the door 10. However, in either of these alternative arrangements, any gap between the side edges 66 of the door panel 12 and the support columns 18 would be exposed from outside with a greater possibility of precipitation entry past the side edges 66 of the door panel 12.

Motion for the door panel 12 to move between closed and opened positions is provided by one or more linear actuators 72. The preferred embodiment uses two linear actuators 72, mounted along the side edges 66 of the door panel 12, each pivotally attached to the door panel 12 at an attachment bracket 74. Because the top of the door panel 12 moves rearward upon opening, the linear actuator could be mounted for attachment at the top of the door panel 12 (i.e., positioning the attachment bracket 74 three to twelve inches above the pivot axis 38), such as extending horizontally behind and above the door opening and mounted hanging from the building ceiling (not shown). However, with the pivot axis 38 being close to the top of the door panel 12, the moment arm for opening the door panel 12 is longer if the attachment bracket 74 is lower in the door panel 12 and further away from the pivot axis 38 than three to twelve inches. The preferred embodiment places the attachment bracket 74 an appropriate distance for the length of the throw of the linear actuator 72.

The preferred linear actuators are hydraulic cylinders 72, which are known in the art for opening and closing garage doors. Each hydraulic cylinder 72 is controllable to extend from a shortened position to a lengthened position or to retract from the lengthened position to the shortened position. For instance, the preferred hydraulic cylinders 72 have a shortened length of about 90 inches, and a throw of at least 38 inches to the lengthened position. The hydraulic schematic of FIG. 9 can be used to control the extension and retraction of the two hydraulic cylinders 72. If only one hydraulic cylinder is used, the hydraulic circuit may be only one half of the hydraulic circuit shown in FIG. 9.

The back end of each hydraulic cylinder 72 is mounted with a pivotal attachment, preferably at an elevation above the attachment bracket 74 when the door 10 is closed. To provide an opening moment for the door panel 12, the back pivot of the hydraulic cylinder 72 must be behind a line extending between the attachment bracket 74 and the pivot axis 38. At the same time, the back end of the hydraulic cylinder 72 is preferably as close to the door panel 12 as possible, so the hydraulic cylinder 72 interferes with less of the room space behind the door panel 12. In the preferred embodiment, the back end of each hydraulic cylinder 72 is mounted from a fixed bracket 76 supported by the upright tube 18, with the pivot location being several inches just laterally inside the upright tube 18 and several inches behind the upright tube 18.

When the door 10 is closed with the cylinders 72 in their shortened length, the preferred cylinders 72 extend at about 6° relative to the plane of the door panel 12 and at about 10° relative to a line extending between the attachment bracket 74 and the pivot axis 38, meaning that initially about 17% of the cylinder force is used as a rotational moment for moving the door panel 12 away from its fully closed position.

Figure 5:
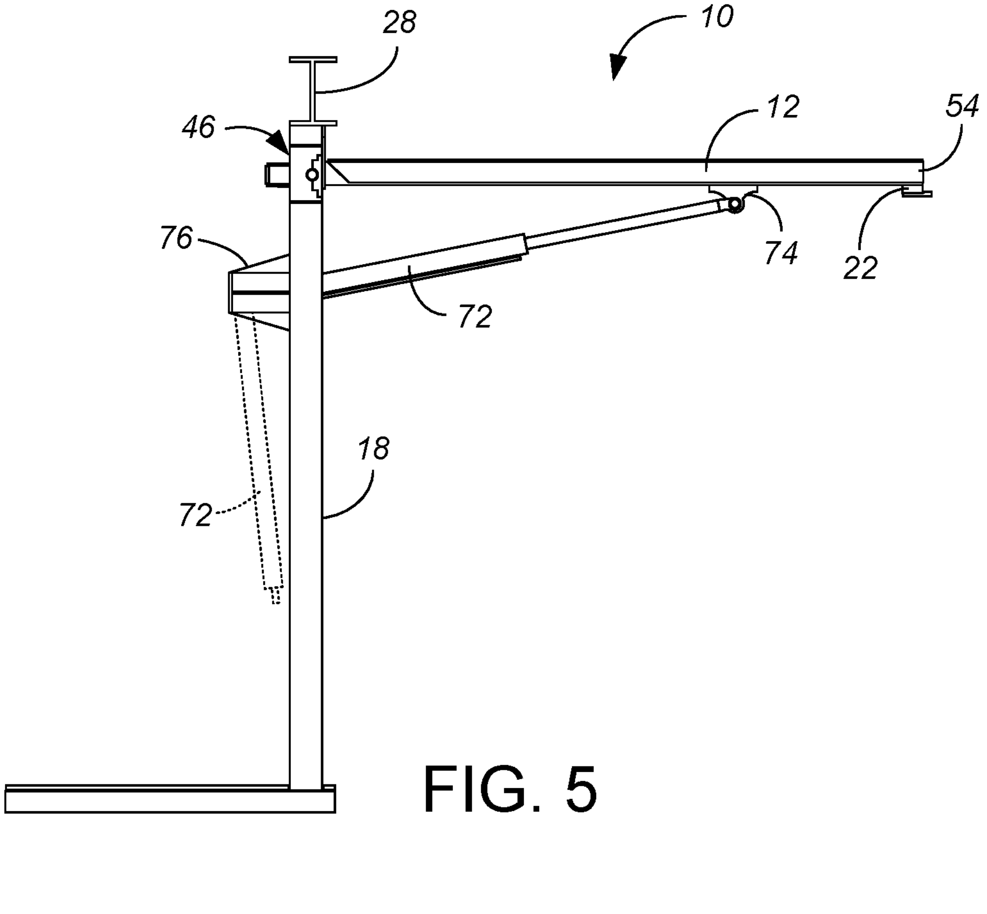
FIG. 5 is a side view of the preferred power garage door in accordance with the present invention in the opened position, but also showing the cylinder position in the closed position in dashed lines.

As best shown in FIG. 5, the preferred fully opened position of the single panel door positions the door panel 12 at a 90° angle or horizontal position, useful such as for providing a canopy when open for a vehicle such as a helicopter or jet. To achieve the horizontal position, the fixed pivot location for the hydraulic cylinders 72 must be below the pivot axis 38 of the door panel 12. In the preferred construction, the entirety of the fixed bracket 76 is lower than a bottom of the hollow tubular crossbar 32 (when the door panel 12 is both in the closed position and in the opened position, since neither the fixed bracket 76 nor the tubular crossbar 32 change elevation during the door panel motion). In the preferred mounting arrangement, this results in each hydraulic cylinder 72, in its lengthened, fully opened position, being at an angle of about 10° past horizontal.

Another aspect of the invention is the way in which the hydraulic system is electronically controlled for best opening and closing motion of the door panel 12, referred to as "smart door" technology. Rather than utilize a measurement of cylinder stroke, hydraulic pressure or a pure time-based system, an inclinometer 78 is mounted to the door panel 12 to electronically detect the door panel angle relative to vertical. In the preferred embodiment, a single axis inclinometer 78 is used, which measures the angle of the door panel 12 relative to its closed position during opening and closing at a relatively low cost. Alternatively, a dual axis inclinometer can be used to maintain balance between the two hydraulic cylinders 72, in addition to controlling the opening or closing of the door. The most preferred embodiment utilizes a LCH-A-S-90-10-05 inclinometer 78 available from Level Developments Ltd. of Croydon, Surrey, United Kingdom, which uses two solid state MEMS sensors in a small aluminum package to output a 0.5 to 9.5V differential analog output on a continuous-outdoor rated cable over a potential full scale range of +90°. The inclinometer 78 may be mounted anywhere on the door panel 12 as convenient, and one preferred embodiment mounts the inclinometer 78 on one of the studs 20 near the pivot tube 32, for less motion of the inclinometer cable during opening and closing of the door panel 12. The signal from the inclinometer 78 is electrically fed to a controller 80 (shown schematically in FIGS. 1 and 2), which in turn adjusts two proportional valves 82 (shown in FIG. 9) to regulate hydraulic flow.

Figure 9:
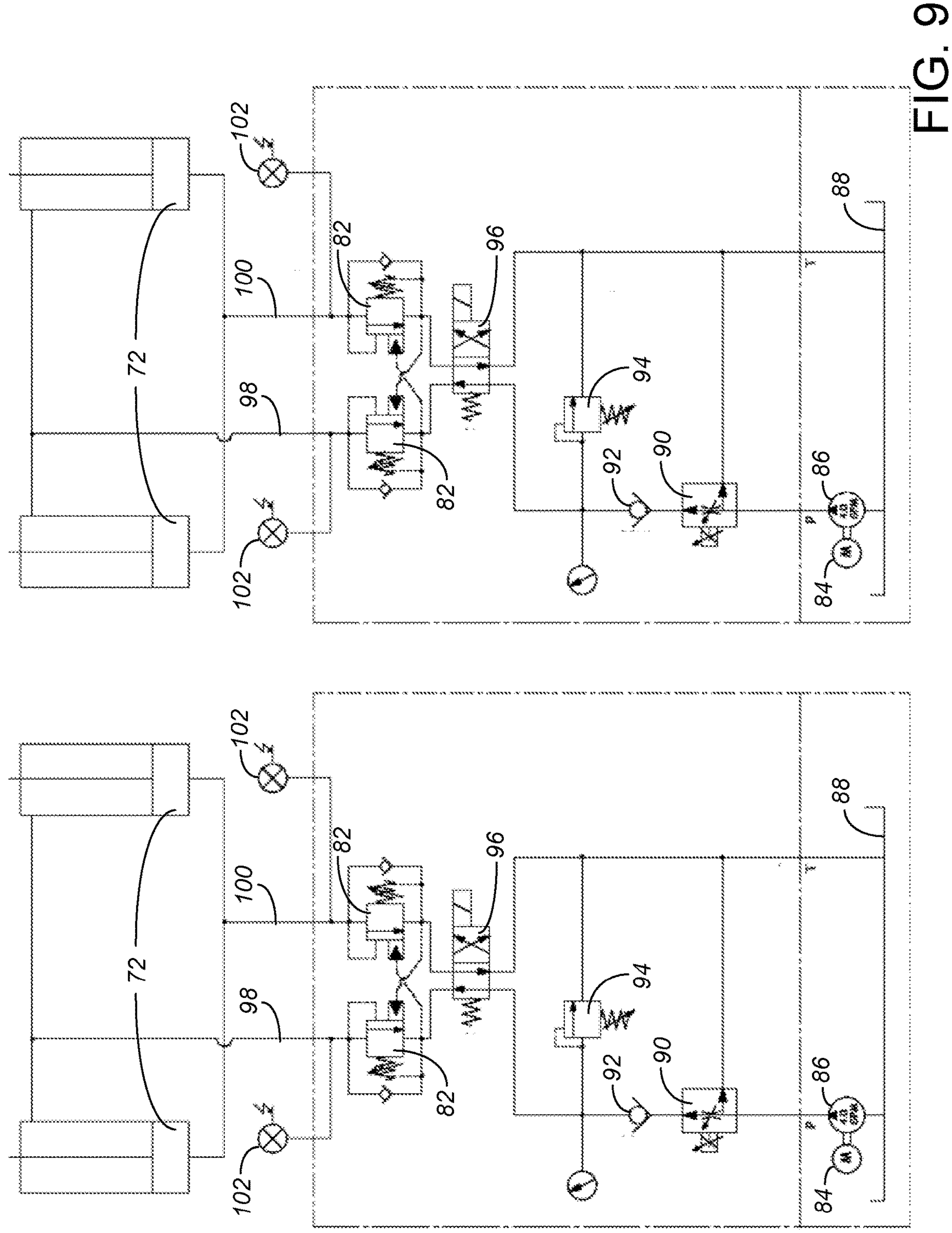
FIG. 9 is a hydraulic schematic for the preferred power garage door in accordance with the present invention.

The preferred hydraulic circuit for the two hydraulic cylinders 72 is represented by the schematic shown in FIG. 9. The systems use two 120-600 VAC 1-30 Hp motors 84 and 5 Hp oil cooled, pressure loaded submersible gear pumps 86 each operating up to a 4.0 GPM flow rate. The pumps 86 run cooler and more efficiently than pumps in many prior art systems. The pumps 86 are contained in a reservoir 88 provided by a nicely contained durable Rotomold hydraulic tank, keeping dust out and providing rust resistance and protection from contaminants, suitable for any environment. Having the pumps 86 installed below oil level allows for performance in all weather conditions, eliminating seasonal adjustment issues due to external flow control which is common on insufficient hydraulic power units by others. Each pump 86 includes a manifold mount to supply hydraulic oil through a 3 port valve 90, check valve 92 and 2500 PSI pressure relief valve 94 to a 24 VDC solenoid operated open/close valve 96. The open/close valve 96 is controlled by the controller 80 to determine whether pressurized oil is being provided to the rod side 98 (in the normal position shown) or to the bore side 100 (when the solenoid is energized) of the hydraulic cylinder 72. Two 3000 PSI holding valves 82 are provided for each hydraulic cylinder 72, one for the rod side 98 and one for the bore side 100. The holding valves 82 are proportionally controlled by an electrical signal from the controller 80. Pressure sensors 102 are provided, both on the rod side 98 and on the bore side 100, to monitor pressure within the hydraulic cylinders 72 thereby ensuring a weather tight seal at all times.

Figure 10:
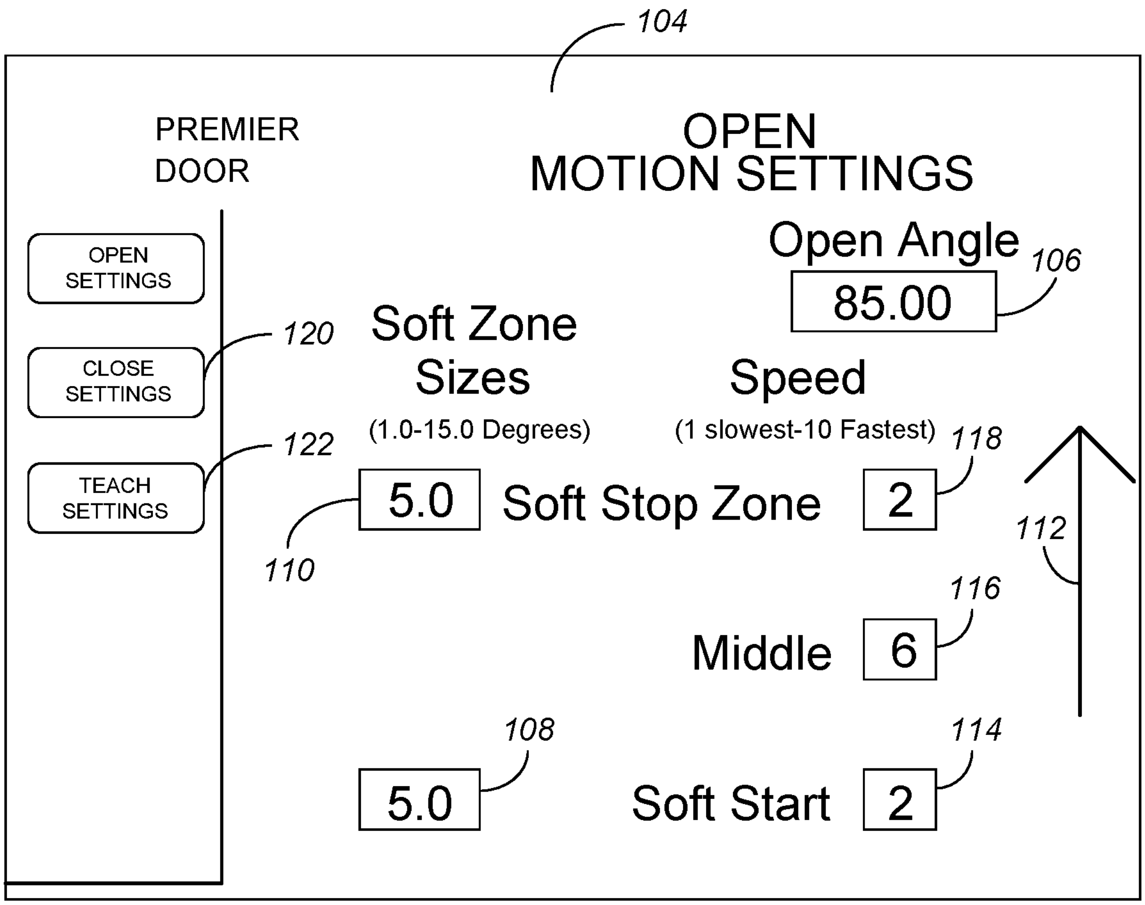
FIG. 10 is a screenshot of one of the set-up screens on the preferred graphical user interface of the present invention.

The system preferably includes a graphical user interface (GUI) 104 for programming settings into the controller 80, with one of its screens shown in FIG. 10. The GUI 104, preferably on a separate touchscreen installed as part of the door system 10 but alternatively provided on a computer (not shown) input via a wired connection (such as on a USB cable connection) or on a smartphone (not shown) input via a wireless connection (such as via Bluetooth), allows for input of variables, operation of the system and feedback regarding the system's status. Initial setup is performed by the installer and changes are allowed by the end user.

When the door panel 12 is first mounted, a "Motion Override" screen (not shown) in the GUI allows manual pressing of a button in the GUI to move the cylinders 72 either further open or further closed (provided no or few faults have been identified). During installation, the user should use the "Motion Override" screen by pressing and holding the Close button until the door panel 12 is firmly closed in the desired physical position. An initialization screen in the GUI is to "Teach Close Setpoint" when the door panel 12 is closed, to zero out the inclinometer reading and allow the closed rod pressure to be set, such as to any value within a preferred range of 500-2000 psi. The closed rod pressure will press the top corner 50 of the door panel 12 against the stationary front top header finishing plate 30, and will press the front side edge finishing plates 58 against the stationary support uprights 18. The Motion Override and Teach Close Setpoint GUI screens may also show readings for the current angle being sensed by the inclinometer 78, for rate of speed of the door panel 12 in degrees per second, and for rod pressure and bore pressure.

Once the Teach Close Setpoint has been completed, the Open Angle of the door panel 12 is selected via the GUI such as in the Open Motion Settings GUI screen 104 shown in FIG. 10. The Open Angle 106 is relative to zero (closed), and thus an angle of 90° is horizontal, i.e., theoretically parallel to the ground. In the example shown in FIG. 10, the user or installer has selected 85° for the fully opened position 106. During open operation the door 10 will stop when this angle is reached. Depending on speeds and Soft Zone Sizes (described below) it is possible for the door panel 12 to slightly pass the selected Open Angle 106 before coming to a complete stop.

The Open Motion Settings GUI screen 104 further allows "Soft Zones" to be set in degrees. Soft zones are angle ranges along the swing of the door panel 12 near the closed and open points in which settings can be manipulated to make the operation of the door panel 12 smoother. The soft zone sizes (angle ranges) are selectable via the GUI at a value between 1 and 15°. For instance, the example shown in FIG. 10 has a Soft Start zone 108 while the door panel 12 is starting to open within 0-5° of the closed position, and has a Soft Stop zone 110 while the door panel 12 is completing its opening motion from 80-85° from the closed position. Having larger values for Soft Zones 108, 110 will allow for smoother operation of the door and smaller values for Soft Zones 108,110 allow for faster operation. The top (soft stop) zone 108 and the bottom (soft start) zone 110 have independent sizes. The Middle zone for the door panel 12 is for the remaining portion of the swing of the door panel 12 that is outside the Soft Start and Soft Stop Zones, in the example of FIG. 10 during the opening motion from 5 to 80° from the closed position. An arrow graphic 112 on the screen indicates the order in which the zones and speed settings are processed.

Zone speeds 114, 116, 118 are values selected in GUI, used to operate the door panel 12 at desired speeds through each zone. Based on numbers entered via the GUI for the proportional driver minimum and maximum values, the system speeds are calculated across this spectrum and are simply represented as values of 1-10, 1 being the slowest and 10 the fastest.

A separate Close Motion Settings screen is available by clicking on a "Close Settings" button 120. The Close Motion Settings screen is identical to the Open Motion Settings screen of FIG. 10 but has a different title and has the arrow graphic pointing downward, allowing control of a set of variables with the same purposes as the Open Motion Settings. The Close Motion Settings are separate from the Open Motion Settings in part to allow greater control, but also because the closing of the door is different due to gravity.

The user can return to "Teach Settings" by clicking on button 122.

After these settings have been selected via the GUI, open operation is as follows:

1) Open motion is initiated by the user pressing an open button (not shown) when the auto mode of the powered garage door 10 is running.
2) Engage the hydraulic pumps 86 and open the appropriate proportional valve 82.
3) Accelerate flow to the cylinders 72 by incrementally increasing the proportional flow through the appropriate holder valve 82 until the door panel 12 reaches the selected speed of the zone in which motion was initiated.
4) If the next zone is reached and that zone's selected speed is greater than the current zone, accelerate to the new zone speed.
5) If the next zone is reached and that zone's selected speed is less that the current zone, decelerate to the new zone speed.
6) Once in the Open Top Soft Zone and the Open Angle is reached, turn pumps 86 off and cease operation.

Close operation is as follows:

1) Close motion is initiated by the user pressing a close button (not shown) when the auto mode of the powered garage door 10 is running.
2) Engage the hydraulic pump 86, switch the open/close solenoid valve 96 and open the appropriate proportional valve 82.
3) Accelerate flow to the cylinders 72 by incrementally increasing the proportional flow through the appropriate holder valve 82 until the door panel 12 reaches the selected speed of the zone in which motion was initiated.
4) If the next zone is reached and that zone's selected speed is greater than the current zone, accelerate to the new zone speed.
5) If the next zone is reached and that zone's selected speed is less that the current zone, decelerate to the new zone speed.
6) Once in the Close Bottom Soft Zone and an angle of zero is reached, deenergize the open/close valve 96, turn pumps 86 off and cease operation.

The following is a list of possible system faults and explanation of the causes. Pressing the OK button on any fault screen will clear it. If multiple faults occurred, subsequent faults will display until all have been cleared by the OK button.

No Cylinder Motion—This fault appears when the system is trying to drive the cylinders but does not detect motion after 10 seconds.

Motion Sensor Blocked—If the system is equipped with safety sensor to detect obstructions, the system will halt if the sensor is blocked during operation.

Unexpected Motion—Unexpected Motion fault is triggered when the system is idle and the position of the door has changed by more than the Unexpected Motion Max value.

Detected Motion In The Wrong Direction—The wrong direction fault is triggered when the door is operating and the systems detects that the door is going the wrong direction by an amount greater than the Wrong Direction Max value.

Current Exceeded—The over current fault is tripped when the motor current is at or above the Max Current value for the selected Time.

Rod Pressure Exceed—Triggered when the rod pressure exceeds the selected Max Rod Pressure.

Bore Pressure Exceed—Triggered when the bore pressure exceeds the selected Max Bore Pressure.

Door ReTighten Attempts Exceeded—This fault will appear if the selected attempts to re-tighten the door exceeds the ReTighten Attempts value is reached within the selected Time.

Door ReTighten Attempt Exceeded 5 Seconds—This fault will appear if the system attempts to re-tighten the door and is not successful within 5 seconds.

The merging of electronics and hydraulics together accomplish a reliable, efficient, smooth and completely "shock-free" door opening and closing for performance based hydraulic door operation, which is especially important for larger width openings. The control system has one touch soft start open and soft door closure, and has manual mode (press and hold) ability as well. The preferred electrical and hydraulic door performance features include:

- Full range of door control in all aspects, via angle measurements preferably calculated by a single axis inclinometer 78.
- Numerous speed options are preferably customer-selected via a graphical user interface (GUI) color touchscreen;
- Full smooth ramping upon starting and stopping the door panel 12, provided by proportional valve controls in the hydraulic system. The smooth ramping system eliminates door slammage caused by insufficient prior art hydraulic systems with no control of door movement (the wider and taller the prior art door dimensions, the more common such deficiencies are. No control=door jarring+slammage). The smooth ramping system also eliminates building structure stress and strain from the door panel 12 itself, and eliminates chatter and loud noise associated with other doors;
- The GUI 104 preferably allows customization for door soft start open and soft start close "points", so the speed profile for opening and closing the door panel 12 can be customized for the particular size and usage requirements of each individual door installation.

All of integral components tied together (hydraulic, electrical, mechanical) are carefully selected or custom manufactured to create a high performance and over all durable package.

Although the present invention has been described with reference to preferred embodiments, workers skilled in the art will recognize that changes may be made in form and detail without departing from the spirit and scope of the invention.

What is claimed is:

1. A powered garage door for use in a building having a door opening defined underneath a header and between two uprights, the powered garage door comprising:

a door panel having a top edge, the top edge, when the door panel is in a closed position wherein the door panel extends generally in alignment with the two uprights, extending underneath and abutting a bottom side of the header, the door panel having two side edges which, with the door panel in the closed position, abut the two uprights, the door panel having a bottom edge which, with the door panel in the closed position, extends between the two uprights;

pivot connectors attached to the door panel to pivotally connect the door panel to the two uprights for pivoting about a fixed pivot the fixed pivot axis extending from one of the two side edges to the other of the two side edges such that when the door panel is moving from the closed position to an opened position the top edge moves rearwardly into the building while the bottom edge moves forwardly away from the building;

at least one linear actuator positioned behind the door panel so as to be within the building when the door panel is in the closed position, the at least one linear actuator being attached to the door panel with an attachment bracket, the attachment bracket, when the door panel is in the closed position, being lower than the fixed pivot axis, the linear actuator being controllable to extend from a shortened configuration to a lengthened configuration or to retract from the lengthened configuration to the shortened configuration;

a front top header finishing plate fixed to the header or one of the two uprights so as to extend downwardly from the header in front of and beneath the top edge of the door panel when the door panel is in the closed position, such that the front top header finishing plate resists precipitation entry between the header and the top edge of the door panel when the door panel is in the closed position;

wherein the door panel comprises:

a frame skeleton having a hollow tubular crossbar running between the side edges; and sheet material secured to the frame skeleton;

and wherein the pivot connectors each comprise:

a pivot arm received partially within the hollow tubular crossbar; and a cylindrical door pivot integrally formed with the pivot arm and extending horizontally along the fixed pivot axis laterally outside the hollow tubular crossbar;

wherein the cylindrical door pivots are received within cylindrical bushings supported by the uprights at an elevation from three to twelve inches lower than the top edge of the door panel when the door panel is in the closed position, and wherein a top of the hollow tubular crossbar is lower than the top edge of the door panel when the door panel is in the closed position;

wherein each said upright comprises a hollow tube supporting a solid bushing support, wherein each of the solid bushing supports comprises:

a back bracket in contact with and supporting a portion of a respective one of the cylindrical bushings; and a front bracket in contact with and supporting another portion of the respective one of the cylindrical bushings;

wherein the front brackets are releasably secured to the back brackets by fasteners, so the front brackets and the cylindrical bushings can be removed from the back brackets during assembly or disassembly of the door panel to the uprights.

2. The powered garage door of claim 1, further comprising:

two front side edge finishing plates fixed to the side edges of the door panel and extending laterally outwardly therefrom, such that, when the door panel is in the closed position, the front side edge finishing plates abut front faces of the two uprights, such that the front side edge finishing plate resist precipitation entry between the uprights and the side edges of the door panel when the door panel is in the closed position.

3. The powered garage door of claim 2, further comprising:

two front side upright finishing plates fixed so as to extend downwardly from ends of the front top header finishing plate to locations lower than the fixed pivot axis, the two front side upright finishing plates being coplanar with the front top header finishing plate with the door panel in both the closed position and the opened position, the two front side upright finishing plates being coplanar and in line with the two front side edge finishing plates when the door panel is in the closed position.

4. The powered garage door of claim 1, wherein the hollow tubes of the uprights support linear actuator fixed brackets, with the at least one linear actuator being two hydraulic cylinders pivotally attached to the door panel at one end thereof and pivotally attached to a respective one of the linear actuator fixed brackets at another end thereof.

5. The powered garage door of claim 4, wherein a top of each of the linear actuator fixed brackets is lower than a bottom of the hollow tubular crossbar in both the closed position and the opened position of the door panel.

6. The powered garage door of claim 1, further comprising:

an inclinometer sensor secured to the door panel to provide an inclinometer signal indicating an inclination angle of the door panel, and an electronic controller receiving the inclinometer signal and controlling the linear actuator to extend or retract based on the inclinometer signal.

7. The powered garage door of claim 6, wherein a rate of extension or retraction of the linear actuator is controlled by the electronic controller based on the inclinometer signal.

8. The powered garage door of claim 7, further comprising a user interface, the user interface allowing a user to select one or more change angles at which the electronic controller changes the rate of extension or retraction of the linear actuator.

9. The powered garage door of claim 8, wherein at least one of the change angles used for opening the door panel is different than at least one of the change angles used for closing the door panel.

10. The powered garage door of claim 8, wherein the user interface allows the user to select different speeds for extension or retraction of the linear actuator based on the inclination angle of the door panel.

11. A powered garage door for use in a building having a door opening defined underneath a header and between two uprights, the powered garage door comprising:

a door panel having a top edge, the top edge, when the door panel is in a closed position wherein the door panel extends generally in alignment with the two uprights, extending underneath and abutting a bottom side of the header, the door panel having two side edges which, with the door panel in the closed position, abut the two uprights, the door panel having a bottom edge which, with the door panel in the closed position, extends between the two uprights, wherein the door panel comprises:

a frame skeleton having a hollow tubular crossbar running between the side edges; and sheet material secured to the frame skeleton;

two pivot connectors attached to the door panel to pivotally connect the door panel to the two uprights for pivoting about a fixed pivot axis, the fixed pivot axis extending from one of the two side edges to the other of the two side edges, such that when the door panel is moving from the closed position to an opened position the top edge moves rearwardly into the building while the bottom edge moves forwardly away from the building, wherein each of the two pivot connectors comprises:

a pivot arm received partially within the hollow tubular crossbar; and a cylindrical door pivot integrally formed with the pivot arm and extending horizontally along the fixed pivot axis outside the hollow tubular crossbar;

wherein the cylindrical door pivots are received within cylindrical bushings supported by the uprights at an elevation from three to twelve inches lower than the top edge of the door panel when the door panel is in the closed position;

wherein a top of the hollow tubular crossbar is lower than the top edge of the door panel when the door panel is in the closed position;

wherein each of the two uprights comprises a hollow tube supporting a solid bushing support, wherein each of the solid bushing supports comprises:

a back bracket in contact with and supporting a portion of a respective one of the cylindrical bushings; and a front bracket in contact with and supporting another portion of the respective one of the cylindrical bushings; and wherein the front brackets are releasably secured to the back brackets by fasteners, so the front brackets and the cylindrical bushings can be removed from the back brackets during assembly or disassembly of the door panel to the uprights; and at least one linear actuator positioned behind the door panel so as to be within the building when the door panel is in the closed position, the at least one linear actuator being attached to the door panel with an attachment bracket, the attachment bracket, when the door panel is in the closed position, being lower than the fixed pivot axis, the linear actuator being controllable to extend from a shortened configuration to a lengthened configuration or to retract from the lengthened configuration to the shortened configuration.

12. The powered garage door of claim 11, further comprising:

an inclinometer sensor secured to the door panel to provide an inclinometer signal indicating an inclination angle of the door panel, and an electronic controller receiving the inclinometer signal and controlling the linear actuator to extend or retract based on the inclinometer signal, wherein a rate of extension or retraction of the linear actuator is controlled by the electronic controller based on the inclinometer signal.

13. The powered garage door of claim 12, further comprising a user interface, the user interface allowing a user to select one or more change angles at which the electronic controller changes the rate of extension or retraction of the linear actuator.

14. The powered garage door of claim 13, wherein at least one of the change angles used for opening the door panel is different than at least one of the change angles used for closing the door panel.

15. The powered garage door of claim 13, wherein the user interface allows the user to select different speeds for extension or retraction of the linear actuator based on the inclination angle of the door panel.

16. The powered garage door of claim 11, wherein the hollow tubes of the uprights support linear actuator fixed brackets, with the at least one linear actuator being two hydraulic cylinders pivotally attached to the door panel at one end thereof and pivotally attached to a respective one of the linear actuator fixed brackets at another end thereof.

17. The powered garage door of claim 16, wherein a top of each of the linear actuator fixed brackets is lower than a bottom of the hollow tubular crossbar in both the closed position and the opened position of the door panel.

* * * * *